United States Patent
Reial et al.

(10) Patent No.: US 11,044,782 B2
(45) Date of Patent: Jun. 22, 2021

(54) DEVICE AND METHOD FOR CONTROLLING IDLE MODE DISCONTINUOUS RECEPTION

(71) Applicant: Telefonaktiebolaget LM Ericsson (publ), Stockholm (SE)

(72) Inventors: Andres Reial, Malmö (SE); Magnus Åström, Lund (SE); Bengt Lindoff, Bjärred (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 31 days.

(21) Appl. No.: 16/469,717

(22) PCT Filed: Jan. 4, 2017

(86) PCT No.: PCT/EP2017/050159
§ 371 (c)(1),
(2) Date: Jun. 14, 2019

(87) PCT Pub. No.: WO2018/127282
PCT Pub. Date: Jul. 12, 2018

(65) Prior Publication Data
US 2020/0015313 A1 Jan. 9, 2020

(51) Int. Cl.
*H04W 76/28* (2018.01)
*H04B 7/0408* (2017.01)
(Continued)

(52) U.S. Cl.
CPC .......... *H04W 76/28* (2018.02); *H04B 7/0408* (2013.01); *H04B 7/0617* (2013.01); *H04L 5/0007* (2013.01); *H04L 5/0098* (2013.01)

(58) Field of Classification Search
CPC .................................................. H04W 76/28
See application file for complete search history.

(56) References Cited

U.S. PATENT DOCUMENTS

| | | | |
|---|---|---|---|
| 2009/0052563 A1* | 2/2009 | Kim | H04L 1/0045 375/260 |
| 2014/0128109 A1 | 5/2014 | Li et al. | |

(Continued)

FOREIGN PATENT DOCUMENTS

| | | |
|---|---|---|
| WO | 2016141961 A1 | 9/2016 |
| WO | 2017146535 A1 | 8/2017 |

OTHER PUBLICATIONS

"Idle Mode Design for 5G RAT", 3GPP TSG-RAN WG2 Meeting #95; R2-164729; Gothenburg, Sweden, Aug. 22-26, 2016, pp. 1-4.
(Continued)

*Primary Examiner* — James P Duffy
(74) *Attorney, Agent, or Firm* — Murphy, Bilak & Homiller, PLLC

(57) ABSTRACT

The present disclosure relates to a wireless device and a method, for use in a wireless device, for controlling discontinuous reception, DRX, during idle mode. The method comprises selecting (S31) a default DRX cycle pattern for controlling operative instants during a DRX cycle and receiving (S32) from an access node, a first set of beams in the operative instants of the default DRX cycle pattern. The method further comprises determining (S33) reception quality metrics for respective beams and determining (S34), based on the reception quality metrics, a customized DRX cycle pattern for controlling operative instants during a subsequent DRX cycle. The customized DRX cycle pattern is applied (S35) in the subsequent DRX cycle to receive a second set of beams.

22 Claims, 4 Drawing Sheets

(51) Int. Cl.
*H04B 7/06* (2006.01)
*H04L 5/00* (2006.01)

(56) References Cited

U.S. PATENT DOCUMENTS

2014/0198696 A1 7/2014 Li et al.
2015/0078189 A1 3/2015 Kwon et al.

OTHER PUBLICATIONS

"Paging in NR—Beamforming Aspects", 3GPP TSG-RAN WG2 #96; R2-167566; Reno, USA, Nov. 14-18, 2016, pp. 1-4.

\* cited by examiner

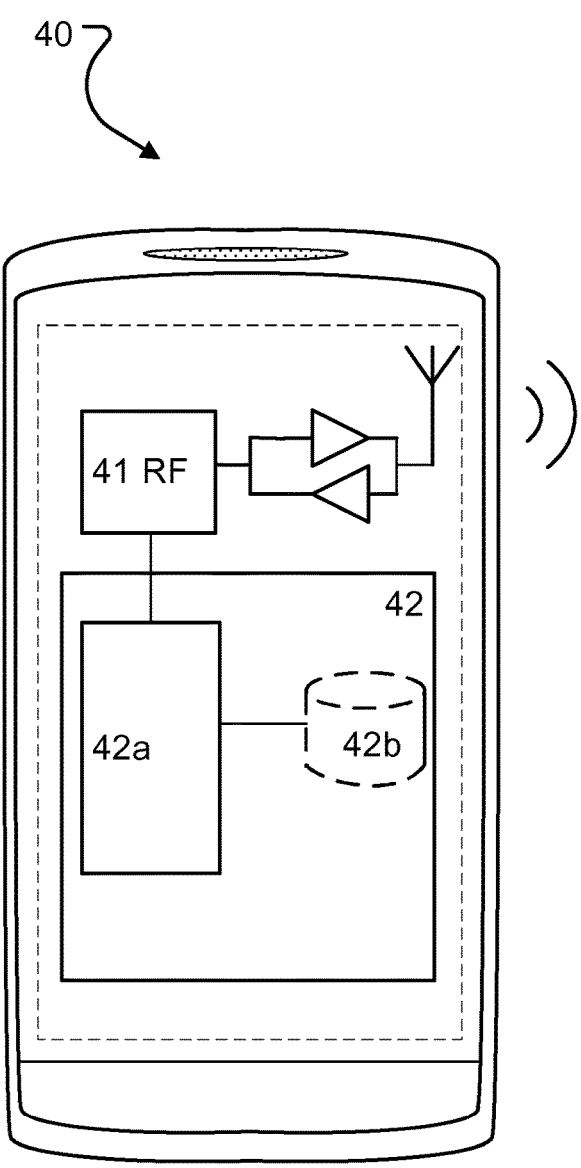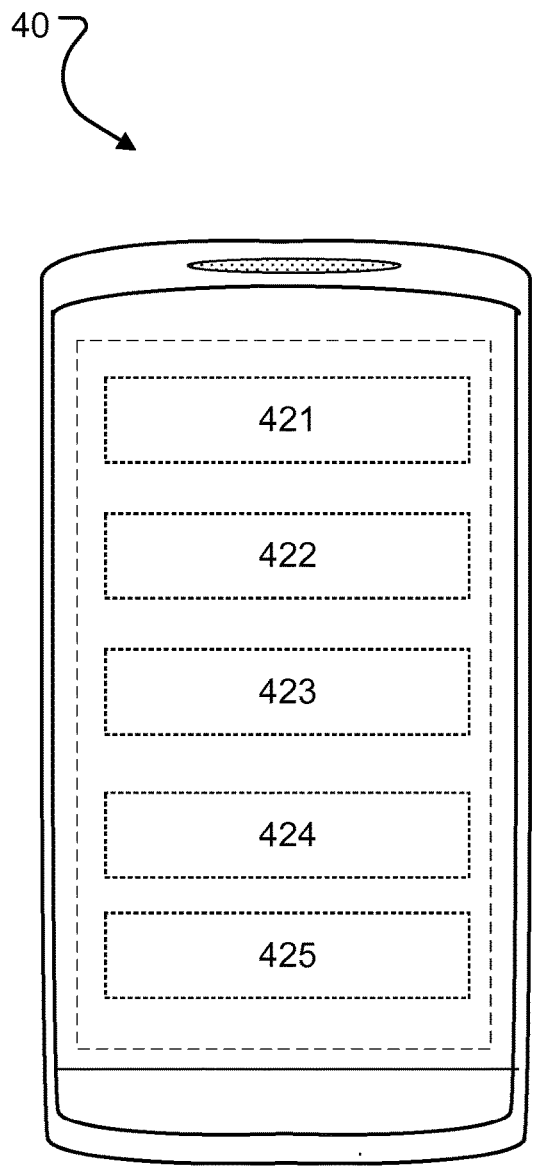
Fig. 4a
Fig. 4b

DEVICE AND METHOD FOR CONTROLLING IDLE MODE DISCONTINUOUS RECEPTION

TECHNICAL FIELD

The present invention relates to a wireless device and a method for controlling discontinuous reception, DRX, during idle mode.

BACKGROUND

The 3rd Generation Partnership Project, 3GPP, is responsible for standardization within the field of mobile telecommunication systems, e.g., for the standardization of the Universal Mobile Telecommunication System, UMTS, and Long Term Evolution, LTE. LTE is a continuously evolving technology for realizing high-speed packet-based communication that can reach high data rates both in the downlink and in the uplink; LTE allows for a system bandwidth of 20 MHz or up to 100 MHz when carrier aggregation is employed. In parallel to the LTE evolution, a new generation of cellular technology—New Radio, NR, is being developed, as part of a $5^{th}$ generation system, 5G. One of the tasks for 5G is to improve throughput and capacity compared to LTE. This is in part to be achieved by moving to higher carrier frequencies where available spectrum exists, and increasing the sampling rate and bandwidth per carrier.

In mobile telecommunication systems a wireless device, also known as user equipment, UE, is wirelessly connected to a radio access node, also known as radio base station, RBS, capable of transmitting radio signals to the wireless device and receiving signals transmitted by the wireless device.

Future cellular technology, e.g., is expected to use advanced antenna systems to a large extent. With such antennas, signals will be transmitted in narrow transmission beams to increase signal strength in some directions, and/or to reduce interference in other directions. The beamforming will enable high data rate transmission coverage also to very distant users. Beamforming may be used at the transmitter, at the receiver, or both, e.g., by using a large antenna array at the access node and a small number of antennas at the wireless device.

In idle mode in a cellular system, the wireless device need to monitor paging in order to determine whether there is data to be received. As previously mentioned, NR will use advanced antenna systems containing large antenna arrays for data transmission. A use of antenna arrays is necessary to ensure sufficient link quality in high-frequency deployments where each individual antenna element aperture is small and does not capture sufficient signal energy. Coherent aligning of the antenna elements give rise to effective beam gain and beam directivity in a desired direction. With such antenna arrays, data signals will be transmitted in narrow beams to increase signal strength in some directions, and/or to reduce interference in other directions. This is done to obtain enable spatial separation and reduce interference between users to obtain improved link quality.

While usage of large arrays with beamforming is usually viewed as a desirable phenomenon when transmitting data between one or more access nodes and designated wireless devices, not all types of signals are suitable for being transmitted employing directive beams. The benefits of beamforming is absent for information distribution of unsolicited data to idle mode wireless devices, e.g., for paging transmission, synchronization signal transmission, or for other types of broadcast transmissions. For such scenarios, a technique of employing so-called beam sweeping is considered where several directive beams are swept over a larger area. The beam sweep is performed by rotating through beams in one or two dimensions, e.g., rotating through beams that are narrow in azimuth and wide in elevation or rotating through beams that are narrow in both elevation and azimuth.

However, there are drawbacks and restrictions also when using beam sweeping. Typically, where beam sweeping is employed, for example by pointing directive beams in an arbitrary order, toward one or more receiving wireless devices, e.g., during paging, neither the receiving wireless device nor the beam sweeping access node is generally aware of which of the beams in the sweep that is best heard by the wireless device. Consequently, time and energy consumption to successfully receive the beam sweep content may be significant.

SUMMARY

An object of the present disclosure is to provide solutions which seek to mitigate, alleviate, or eliminate one or more of the above-identified deficiencies in the art and to provide solutions for improving energy efficiency in an idle mode wireless device. In particular, the present disclosure addresses the problem of accommodating discontinuous reception of beams that are received in beam sweeps from one or more access nodes.

This object is obtained by a method, for use in a wireless device, for controlling discontinuous reception, DRX, during idle mode. The method comprises selecting a default DRX cycle pattern for controlling operative instants during a DRX cycle and receiving from an access node, a first set of beams in the operative instants of the default DRX cycle pattern. The method further comprises determining reception quality metrics for respective beams and determining, based on the reception quality metrics, a customized DRX cycle pattern for controlling operative instants during a subsequent DRX cycle. The customized DRX cycle pattern is applied in the subsequent DRX cycle to receive a second set of beams.

The disclosed method provides for reducing idle mode energy consumption by controlling reception so that a DRX receiver may be activated only during customized operative instants of a DRX cycle, i.e., reducing on-time for the DRX receiver.

According to an aspect of the disclosure, the first and second set of beams are comprised in respective beam sweeps transmitted from an access node with a DRX cycle periodicity and wherein each beam comprises at least one OFDM symbol.

Thus, the present disclosure is particularly applicable in transmissions using orthogonal frequency division multiplexing, OFDM, as a method of encoding digital data, and wherein the transmissions are performed as beam sweeps in one or two dimensions; transmitting a plurality of beams with different directions in each beam sweep.

According to another aspect of the disclosure, the default DRX cycle pattern is configured to accommodate reception of a plurality of beams comprised in a beam sweep and the customized DRX cycle pattern is configured to accommodate a subset of the beams comprised in the beam sweep.

Thus, the customized DRX cycle pattern may be configured to accommodate a most relevant subset of beam comprised in the beam sweep. Since there is usually only one or a few beams receivable by the wireless device, adapting the on-time for the receiver to reception to receive one or a few beams allows significant reduction of the idle mode energy consumption with compromising the ability for the wireless device to receive information from a transmitting access node.

According to an aspect of the disclosure, each beam comprises paging information, unsolicited system information or broadcast information.

Consequently, paging information or other types of unsolicited system information or broadcast information may be received in a narrow reception window that is customized by the receiving wireless device based on reception capabilities and requirements.

The above object of the disclosure is also obtained by a computer readable storage medium storing a computer program which, when executed in wireless device, causes the wireless device to execute any of the above mentioned aspects.

Likewise, the object of the disclosure is obtained by a wireless device that is configured for controlling discontinuous reception, DRX, during idle mode. The wireless device comprises receiver circuitry arranged for beam reception during operative instants of a DRX cycle. The wireless device also comprises processing circuitry configured to cause the wireless device to select a default DRX cycle pattern for controlling operative instants during a DRX cycle and receive from an access node, a first set of beams in the operative instants of the default DRX cycle pattern. The processing circuitry is further configured to cause the wireless device to determine reception quality metrics for respective beams, determine, based on the reception quality metrics, a customized DRX cycle pattern for controlling operative instants during a subsequent DRX cycle and to apply the customized DRX cycle pattern in the subsequent DRX cycle to receive a second set of beams.

The computer readable storage medium comprising the computer program and the wireless device enable the corresponding advantages of those described above in relation to the method for use in a wireless device.

BRIEF DESCRIPTION OF THE DRAWINGS

The foregoing will be more readily understood from the following detailed description of example embodiments, as illustrated in the accompanying drawings in which like reference characters refer to the same parts throughout the different views. The drawings are not necessarily to scale, emphasis instead being placed upon illustrating the example embodiments.

FIG. 4
a. illustrates an example wireless device configuration;
b. illustrates an example wireless device configuration.

DETAILED DESCRIPTION

Figure 1A:
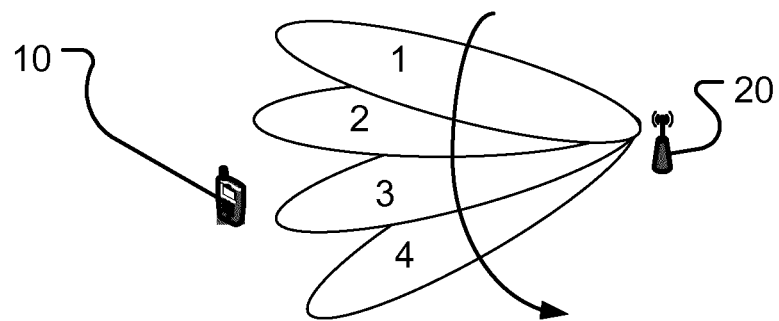
FIG. 1
a. illustrates transmission of a beam sweep from a network node having one transmission point.
b. illustrates a beam sweep transmitted from two separate transmission points

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments.

Within the context of this disclosure, the terms "wireless device" or "wireless terminal" encompass any terminal which is able to communicate wirelessly with an access node of a wireless network, as well as, optionally, with another wireless device, by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" may sometimes be used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless device as defined above.

In some embodiments the term "access node", AN, is used and it can correspond to any type of access node or any network node communicating with a wireless device. In the context of this disclosure, the term access node is used to designate a node transmitting beams in a beam sweep to a receiving wireless device. Examples of access nodes are NodeB, base station, multi-standard radio, radio node, eNodeB, gNodeB, network controller, radio network controller, base station controller, relay, donor node controlling relay, base transceiver station, access point, transmission points, transmission nodes, nodes in distributed antenna system, DAS etc.

In support for higher frequencies in New Radio, NR, communication systems, beamforming is an essential component. Using antenna arrays at access nodes, fairly regular grid-of-beams coverage patterns with tens or hundreds of candidate beams per node may be created. The coverage area of an individual beam from such an antenna array may be small, down to the order of some tens of meters in width. Outside the beam area, quality degradations may occur quickly due to the limited coverage area of the beam. Beam sweep procedures are typically employed whereby a plurality of beams, e.g., comprising reference signals used for paging or synchronization or other type of system information signals, are sequentially transmitted in a respective beam directions from an access node.

In order for idle mode operations, e.g., paging procedure not to be the coverage-limiting factor in the next generation of communication systems, the reference signals used for paging and synchronization will typically also have to use high-gain narrow beams. This means that the access node will typically have to transmit the signals multiple times, in different directions, to cover the geographical area to be served by an access node, AN. With some typical antenna configurations envisioned for the next generation communication systems, sometimes referred to as 5G systems, a narrow beam may cover only a small fraction of the entire geographical area (e.g. 1%) at a time, and consequently it may take substantial time to transmit the beam in all directions needed, one or a few directions at a time.

Figure 1B:
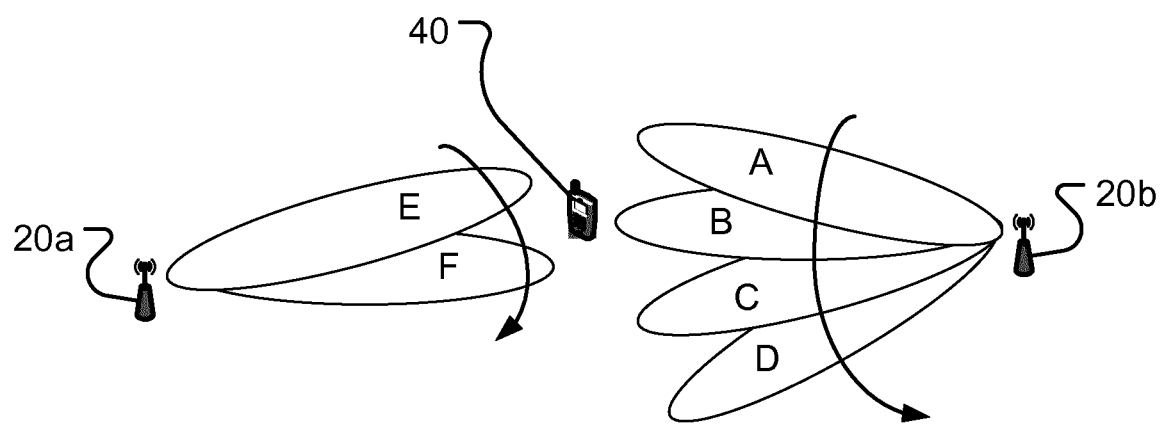

The procedure of sequentially transmitting the beam in all necessary directions is referred to as a beam sweep or beam scan. "Necessary directions" here means all directions where coverage is desired. FIG. 1a illustrates a beam sweep comprising beams A-D and transmitted from an access node 20 having one transmission point. In the NR systems, it is also expected that one single access node might have several transmission points, as illustrated by access nodes 20a and b in FIG. 1b, where a first access node 20a transmits beams A-D to a receiving wireless device and a second access node 20b transmits beams E-F to the wireless device. A beam sweeping procedure is anticipated during paging of wireless devices or other types of transmission of unsolicited data toward an idle wireless device, e.g., other types of broadcast system information distribution. In high frequency bands, where narrow beams may be required, the beams in a sweep may add up to a substantial number. The paging information may be transmitted in one or a few OFDM symbols per beam.

The methods and wireless device aspects presented in this disclosure addresses the conflicting demands between wireless device energy consumption and on demand accessibility to a wireless device, i.e., the need for prompt and successful communication also with idle mode devices. In particular, the present disclosure reduces energy consumption in an idle mode wireless device without compromising the ability for the wireless device to receive paging information, unsolicited system information and/or broadcast information through a receiver configured to operate in according to a discontinuous reception, DRX, cycle. The basic idea is to configure a wireless device to control a discontinuous reception, DRX, set up, so that a receiver in the wireless device is activated only during the limited number of beams that the wireless device is capable of distinguishing in the beam sweep. Thus, a more energy efficient reception procedure is established within a wireless device without jeopardizing the on demand accessibility.

Figure 2:
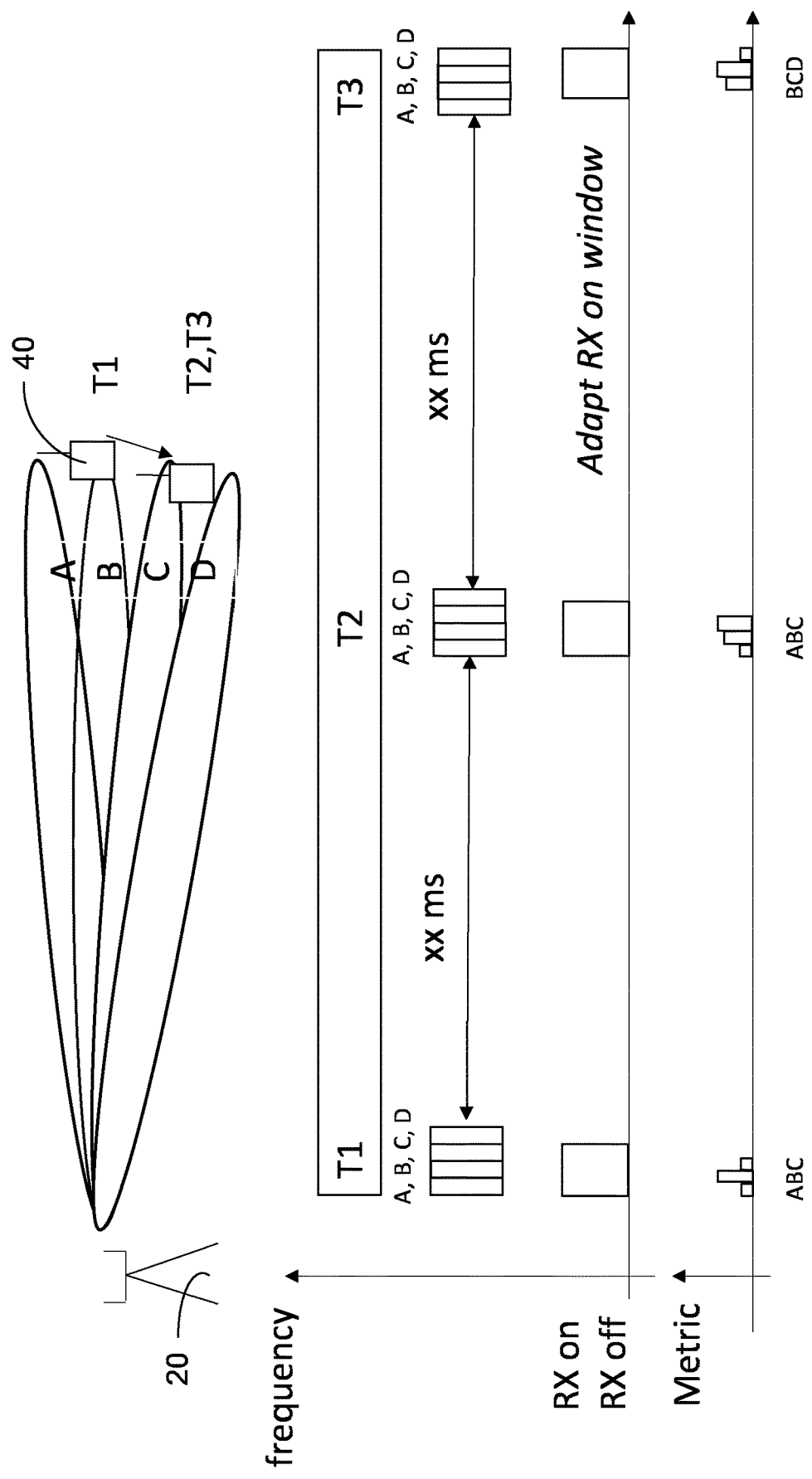
FIG. 2 illustrates beam sweep reception in a wireless device

Turning to FIG. 2, discontinuous reception, DRX, in a wireless device is briefly discussed to further explain the basic concept of beam sweep reception during idle mode. FIG. 2 further details the presentation of the beam sweep illustrated in FIG. 1a. The discussion will be made for the beam sweep comprising paging information; however, similar principles are of course also applicable for beam sweeping procedures comprising transmission and reception of other types of unsolicited system information to an idle mode wireless device. The beam sweep is periodically performed according to a predetermined cycle, and the DRX receiver of the wireless device is activated in accordance with this cycle, hereinafter referred to as DRX cycle.

An access node 20, e.g., an eNodeB or gNodeB, transmits paging information in beams A-D with different directions; each beam corresponding to OFDM symbol sets A, B, C, D. The beams are transmitted in a beam sweep where transmission of beam A occurs in a time instant different from transmission of beams B-D, e.g., in a time instants that precedes the time instants when beams B to D are transmitted. The OFDM symbol set may comprise a single OFDM symbol. An idle mode wireless device 40 is configured for discontinuous reception, DRX, according to a DRX cycle; enabling reception in receiver circuitry during operative instants for the receiver. The operative instants recur according to a DRX cycle pattern, e.g., every 100-10 000 ms, determined for the wireless device based on a paging periodicity used by the access node.

At time T1, the wireless device 40 is in a beam direction of beam B. Thus, at T1, reception of beam B would be superior to reception of the other narrow beams A, C and D illustrated for the beam sweep. As visualized in FIG. 2, it is unlikely that the wireless device would be able to receive beam D. In accordance with the basic principles of the present disclosure, as mentioned above, it would be beneficial from an energy saving perspective to adapt the DRX cycle pattern (i.e., a receiver-on window) for the wireless device receiver circuitry so that the receiver circuitry is active just long enough to receive beam B. FIG. 2 illustrates how a receiver-on window is adapted so that the receiver is turned on one OFDM symbol set prior to beam B (i.e., for the time instant of beam A) and turned off one OFDM symbol set after beam B (i.e., for the time instant of beam C). Initially, a receiver window may be open for reception through the entire beam sweep, but for the illustrated scenario this would still imply receipt of beams A-C at T1.

As will be further discussed and disclosed below, a wireless device at T1 would be able to limit a reception window to just accommodate reception of beam B or to also accommodate reception of a few neighboring beams.

At time T2, the wireless device has moved and beam B is no longer the best beam from a receiver perspective, as visualized by the disclosed metrics. Instead, beam C appears to represent the best beam. Furthermore, beam A is now barely perceivable and does no longer contribute in the communication of paging information. Accordingly, the beam reception window should now be adapted to accommodate reception of beam C and possibly neighboring beams. The determined metrics are used to determine an updated beam reception window accommodating beams B-D from time T3. The accommodation of beams B-D is enabled by delaying the receiver-on time relative to a reference time of the DRX cycle, e.g., the start time for a DRX cycle.

Figure 3:
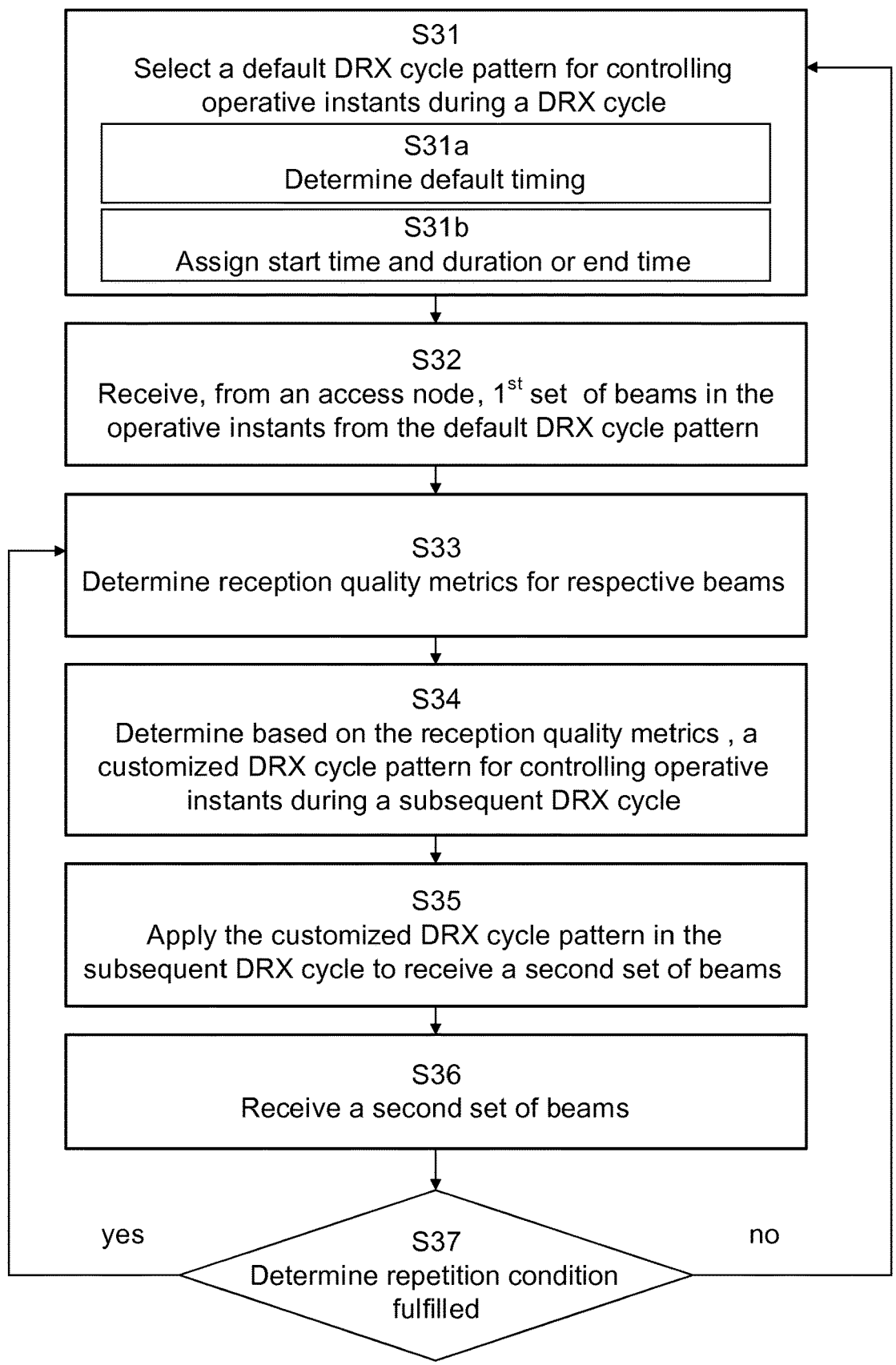
FIG. 3 is a flowchart illustrating method steps performed in a wireless device for embodiments of the disclosure.

A method for controlling discontinuous reception, DRX, in a wireless device will now be presented. FIG. 3 illustrates, in a flowchart, exemplary operations performed in a wireless device when operating in a wireless communication network. The disclosed method provides a solution for controlling DRX during idle mode. The wireless device selects S31 a default DRX cycle pattern for controlling operative instants during a DRX cycle. According to an aspect of the disclosure, an operative instant is a beam reception window periodically recurring during a DRX cycle. According to one alternative aspect of the disclosure, the default DRX cycle pattern is a state of the art DRX window comprising a plurality of time consecutive operative instants; the state of the art DRX window being activated at a receiver start time and deactivated at a receiver off time or following a predetermined duration, and recurring with each DRX cycle.

Thus, according to this aspect, the wireless device initially receives during the entire DRX window. According to another alternative aspect of the disclosure, the default DRX cycle pattern comprises a plurality of operative instants having a temporal duration less than a state of the art DRX window and selected following the steps of determining S31a a default timing for receiving beams comprised in a beam sweep during the DRX cycle, and assigning S31b a start time, and a duration or end time for each operative instant of the default DRX cycle pattern based on the determined default timing. Thus, according to this aspect, the wireless device determines a first approximate timing, i.e., default timing, and selects a default DRX cycle pattern by selecting a receiver start time and a receiver off time or receiver duration, based on the approximate timing. As one example, the wireless device initially detects paging signals during an entire DRX paging monitoring window, i.e., DRX window and determines the timing for the best beam, i.e., the timing for the best sweep direction.

In a subsequent step, the wireless device receives S32, from an access node, a first set of beams in the operative instants of the default DRX cycle pattern. Applying the selected default DRX cycle pattern in a DRX cycle, the wireless device receives the first set of beams; the first set of beams comprised in a beam sweep received from an access node with a DRX cycle periodicity and each beam of the first set of beams comprising at least one OFDM symbol. As mentioned above, the default DRX cycle pattern is configured to accommodate reception of a plurality of beams comprised in a beam sweep. Thus, the present disclosure is particularly applicable in transmissions using orthogonal frequency division multiplexing, OFDM, as a method of encoding digital data, and wherein the transmissions are performed as beam sweeps in one or two dimensions; transmitting a plurality of beams with different directions in each beam sweep.

According to an aspect of the disclosure, reception S32 from an access node, of a first set of beams in the operative instants of the default DRX cycle pattern comprises receiving the first set of beams over a plurality of DRX cycles. Fractions of an entire DRX window may be swept in a random or sequential order, so that reception during the plurality of DRX cycles comprises receiving the first set of beams during at least partially non-overlapping subsets of the operative instants. Sweeping a plurality of at least partially non-overlapping fractions of the entire DRX window would result in a beam sweep procedure whereby reception of the first set of beams, e.g., all beams in the beam sweep, is accommodated in the time period corresponding to said plurality of DRX cycles.

Upon receipt of a first set of beams in the operative instants of the default DRX cycle pattern, the wireless device determines S33 reception quality metrics for respective beams. According to an aspect of the disclosure, each beam comprises paging information, unsolicited system information or broadcast information. Reception quality for respective beams may be determined in a number of ways, e.g., by measuring received signal strength for a given beam or information comprised in the beam, e.g., as a set of resource elements in one or more OFDM symbols of the beam. According to aspects of the disclosure, the determining of reception quality metrics for respective beams comprises, decoding a set of resource elements in a first OFDM symbol received in an operative instant of the default DRX cycle pattern and determining a first metric associated to the decoding performance. A corresponding set of resource elements are decoded in at least a second OFDM symbol received in an operative instant of the default DRX cycle pattern, where the OFDM symbols may be received in a continuous operative instant having a duration to accommodate reception of a plurality of OFDM symbols, or in discrete operative instants, each OFDM symbol received in a respective operative instants. A second metric associated to the decoding performance when decoding resource elements in the at least second OFDM symbol is determined. Simple metrics that are considered as representative of the decoding performance comprise soft value metrics, e.g., decoding error likelihood estimate of a paging signal. Other metrics may be determined from a correlation with first known symbols (e.g., with pilot symbols/signals) that are transmitted in some resource elements, and wherein the metric in this case is related to a correlation matching performance, i.e., how closely the received signal resembles a known pilot signal.

According to other aspects of the disclosure, the determining S33 of reception quality metrics comprises receiving beams in the operative instants of the default DRX cycle pattern during a plurality of DRX cycles; determining quality metrics for respective beams in each of the plurality of DRX cycles, and determining the reception quality metrics by filtering the quality metrics from the plurality of DRX cycles. Thus, filtering over several obtained first and second decoding metrics may be used in some embodiments in the determining of the reception quality metrics.

According to aspects of the disclosure, the first and second OFDM symbols may be adjacent. However, the disclosed method is also applicable in when beam sweeping is made in two dimensions and in such instances the first and second OFDM symbols may very well be non-adjacent. Furthermore, the monitored OFDM symbol sets may be non-adjacent so that the operative instants in the customized DRX cycle pattern are time discrete. Receiver circuitry of the wireless device may then be switched off between monitored OFDM symbol sets as accommodated by the applied DRX cycle pattern.

Based on the reception quality metrics, the wireless device performs the step of determining S34 a customized DRX cycle pattern for controlling operative instants during a subsequent DRX cycle. In its most basic embodiment, the customized DRX cycle pattern presents an updated time on and time off or duration for receiver circuitry in the wireless device. When the method is initiated using a state of the art DRX window as default DRX cycle pattern, use of the customized DRX cycle pattern will imply that the DRX receiver is activated during a shorter time period of a DRX cycle as compared to the state of the art DRX window. As mentioned previously, the beams are comprised in respective beam sweeps transmitted from an access node with a DRX cycle periodicity and wherein each beam comprises at least one OFDM symbol. According to aspects of the disclosure, the default DRX cycle pattern is configured to accommodate reception of a plurality of beams comprised in a beam sweep and the customized DRX cycle pattern is configured to accommodate a subset of the beams comprised in the beam sweep; thereby achieving the benefits of reduced energy consumption during idle mode of the wireless device. However, if the default DRX cycle pattern has been selected based on an initial approximate timing to accommodate reception of beams within a time instant determined from the approximate timing, the customization of the DRX cycle pattern could also imply an extension of the receiver window.

According to other aspect, the determining S34 of the customized DRX cycle pattern for controlling operative instants during a subsequent DRX cycle comprises selecting one or more time intervals in a beam reception window of the default DRX cycle pattern; each time interval being determined by a start time, and a duration or end time; and wherein the selecting is made by a comparison of determined metrics. According to further aspects of the disclosure, the customized DRX cycle pattern is determined to comprise operative instants to accommodate beams having qualitatively similar reception quality metrics. Thus, when there are a number of beams perceived to be received with equal or close to equal reception quality, the customized DRX cycle pattern will comprise a larger set of operative instants as compared to the situation when one beam is clearly better than the others. According to aspects of the disclosure, the customized DRX cycle pattern should comprise the best beams, i.e., beams qualified to be accommodated through their determined reception quality metrics. According to further aspects of the disclosure, the customized DRX cycle pattern also accommodates one or more neighboring beams of such best beams.

The customized DRX cycle pattern is applied S35 in a subsequent DRX cycle, e.g., the first subsequent DRX cycle for which application is possible or a later DRX cycle, to receive a second set of beams. In accordance with aspects presented above, the second set of beams is comprised in a beam sweep transmitted from an access node with a DRX cycle periodicity and wherein each beam comprises at least one OFDM symbol. Applying the customized DRX cycle pattern in a later DRX cycle provides an opportunity to verify the customized DRX cycle pattern by repeating the steps of receiving beams in operative instants of the default DRX cycle pattern; and determining the reception quality metrics by filtering quality metrics from a plurality of DRX cycles.

According to an aspect of the disclosure a second set of beams are received S36, from an access node, in the operative instants of the customized DRX cycle pattern when applying the customized DRX cycle pattern in the subsequent DRX cycle to receive a second set of beams. According to an aspect of the disclosure, the customized DRX cycle pattern is used also in further subsequent DRX cycles to receive further set of beams, e.g., when the access nodes transmits a beam sweep comprising paging information.

According to other aspects, the process of determining a customized DRX cycle pattern may also be repeated; either to refine the determined customized DRX cycle pattern further or to allow for tracking of a wireless device that is in a mobility state. According to aspects of the disclosure, the wireless device determines S37 fulfillment of a repetition condition, and when the condition is fulfilled, repeats the steps of determining S33 reception quality metrics for respective beams, determining S34 the customized DRX cycle pattern, and applying S35 the customized DRX cycle pattern, or returning to the default DRX cycle pattern. The repetition condition could be based on wireless device mobility, determining fulfillment of the repetition condition when the wireless device is stationary or in a low mobility state. The repetition condition could also be set to reflect a need for periodic reassessment of the customized DRX cycle pattern, e.g., that the process is repeated during a predetermined number of DRX cycles to verify a previous assessment or according to a specified periodicity. Finally, the repetition condition may be set so that the full process is repeated when the repetition condition is no longer fulfilled, e.g., after a predetermined number of DRX cycles to ensure that the ability to receive the access node transmission is not compromised. The process is repeated by reverting to the step of selecting S31 the default DRX cycle pattern.

The disclosed method is foremost intended for a wireless device that is in a state of low mobility, but is not limited to low mobility applications. A Doppler estimator or positioning information from a GPS unit in the wireless device could be used to detect the mobility state of the wireless device. As mobility increases, the need to update the customized DRX cycle pattern also increases. Thus, a repetition condition as mentioned above comprises a mobility state of the wireless device so that the repeating is performed when the wireless device is stationary or in a low mobility state.

Occasionally, the wireless device may be configured to revert to reception according to the default DRX cycle pattern, e.g., during an entire DRX window in a DRX cycle. The above disclosed process may then be resumed.

Notably, the transmission of the beam sweep is from the access node is unaffected by the disclosed method, it is the energy efficient extraction of beams in a receiving wireless device that is addressed through the above disclosed method.

The proposed method will now be exemplified with an embodiment where the access node beam sweep occurs in one dimension, e.g., as suggested in FIG. 2. The beams of the beam sweep, i.e., OFDM symbol sets, comprise paging information. When performing the beam sweep in one dimension, each transmitted OFDM symbol set is adjacent to the next OFDM symbol set. Since usually there is only one beam (or a few) that the wireless device can hear, most of the reception window is empty for the wireless device and the long receiver operation at each paging cycle contributes to redundant idle mode power consumption. According to the general concept of the disclosure, explained above, the wireless device performs a decoding of information, e.g., decoding the paging information, received from multiple beams in a sweep, computes a metric for each of the received beams (OFDM symbol(s)) and adapts a receiver window position and/or duration according to the determined metric thereby determining a customized DRX cycle pattern.

The DRX reception of the wireless device initially follows a default DRX cycle pattern that may be determined from a first paging timing and a corresponding receiver-on time. This determination of the default DRX cycle pattern may be made by a wide search or scan over a large number of beams and corresponding paging OFDM symbol sets. During the sweep, when the access node steps through a set of narrow beam directions, neither the wireless device nor the access node is generally aware of which of the beams in the sweep is best heard by the wireless device. The DRX window, i.e., the default DRX cycle pattern, must thus be specified such that the entire beam sweep is accommodated, and the wireless device must receive data during the entire sweep duration. The default DRX cycle pattern is determined as a "receiver-on" time window, e.g., corresponding to a plurality of adjacent time instants, also denominated as operative instants, when the receiver is activated to receive the transmitted beams.

The wireless device then decodes a first set of resource elements corresponding to paging information in a first and second set of OFDM symbols received with the default DRX cycle pattern. The wireless device determines first and second metrics for decoded resource elements in corresponding first and second set of OFDM symbols, e.g., by determining the reception quality for the decoded paging information or by determining a correlation between resource elements corresponding to pilot signals used for estimating and equalizing the radio channel for paging detection.

The computed first and second metric are compared and if the second metric represents a better result than the first metric, the wireless device selects a customized DRX cycle pattern to control activation of the receiver circuitry during a subsequent DRX cycle. In a scenario where one main OFDM symbol set is determined to provide the best reception quality metric, the customized DRX cycle pattern corresponds to a "receiver-on" wake up time and end time so that the receiver is activated just long enough to receive the beam of the main OFDM symbol set, and possibly neighboring beams.

In summary, the above wireless device may operate according to the above disclosed exemplifying embodiment by:
- initially receive during an entire DRX window.
- determine the best beam timings in relation to the DRX window beginning.
- in subsequent DRX cycles, delay receiver wake-up with respect to the DRX window beginning and shutting down before the end of the window; the window is kept open just enough to receive the best beams (for data reception) and their neighbor beams (for tracking).
- after each or some DRX cycle, update the best beam and tracking info to be used during the next DRX cycle; and
- occasionally, revert to reception during the entire DRX window to detect new possible best beam timings.

In accordance with an alternative embodiment, the default DRX cycle pattern could also be implemented by sweeping a plurality of fractions of an entire DRX window in a random or sequential order. Sweeping a plurality of at least partially non-overlapping fractions of the entire DRX window would result in all non-active beams having been searched after a time period corresponding to a plurality of DRX cycles. When reverting to reception according to the default DRX cycle pattern, the wireless device could revert to reception in a plurality of fractions of an entire DRX window to ensure that a reception window, i.e., the customized DRX cycle pattern, continues to accommodate a best beam and one or more neighbor beams.

Embodiments of the present disclosure, e.g., as explained with reference to FIG. 3, are not limited to beam sweeping in one dimension. In embodiments where the beam sweeping is made in two dimensions, the next closest may correspond to a second OFDM symbol set that is not adjacent to the first OFDM symbol set. Hence, the time window may not only be adapted in time, but the length of an operative instant in the RX on time window may be changed if second metric larger than first metric. In another embodiment, due to similar reasons as above, operative instants of the RX on window may be non-contiguous, i.e., the OFDM symbols sets that are monitored may be non-adjacent, and the receiver circuitry is switched off between monitored OFDM symbols sets.

In some of the above examples, the method for controlling discontinuous reception has been described for the example of paging. However, the disclosure is not limited to paging, but is also applicable to other beam swept system information or other control plane information reception.

Furthermore, it should be noted that the various example embodiments described herein are described in the general context of method steps or processes, which may be implemented in one aspect by a computer program product, embodied in a computer-readable medium, including computer-executable instructions, such as program code. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed in FIG. 3. The particular sequence of such executable instructions or associated data structures represents examples of corresponding acts for implementing the functions described in such steps or processes.

FIG. 4a is an example configuration of a wireless device 40, which may incorporate some of the example embodiments discussed above. The wireless device 40 is configured for controlling discontinuous reception, DRX, during idle mode. As shown in FIG. 4, the wireless device comprises receiver circuitry 41 arranged for reception of radio signals received as beams in a beam sweep from a transmitting access node. It should be appreciated that the receiver circuitry 41 may be comprised as any number of receiving units or circuitry. It should further be appreciated that the receiver circuitry 41 may be in the form of any input communications port known in the art.

The wireless device further comprises processing circuitry arranged to control operation of the wireless device. In particular, the processing circuitry 42 is configured to cause the wireless device to select a default DRX cycle pattern for controlling operative instants during a DRX cycle and to receive, by means of the receiver circuitry, from an access node, a first set of beams in the operative instants of the default DRX cycle pattern. The processing circuitry 42 is further configured to determine reception quality metrics for respective beams, to determine, based on the reception quality metrics, a customized DRX cycle pattern for controlling operative instants during a subsequent DRX cycle, and to apply the customized DRX cycle pattern in the subsequent DRX cycle to receive a second set of beams.

According to an aspect of the disclosure, the processing circuitry comprises a processor 42a and a memory 42b. The processor 42a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 42b may further be configured to store received data and/or executable program instructions. The memory 42b may be any suitable type of computer readable memory and may be of volatile and/or non-volatile type.

FIG. 4b also illustrates an embodiment of a wireless device 40 configured for controlling discontinuous reception, DRX, during idle mode. The wireless device comprises a cycle pattern selection module 421 for selecting a default DRX cycle pattern for controlling operative instants during a DRX cycle; a beam reception module 422 for receiving a first set of beams in the operative instants of the default DRX cycle pattern; a metrics determination module 423 for determining reception quality metrics for respective beams; a DRX cycle pattern determination module 424 for determining, based on the reception quality metrics, a customized DRX cycle pattern for controlling operative instants during a subsequent DRX cycle; and a cycle pattern application module 425 for applying the customized DRX cycle pattern in the subsequent DRX cycle to receive a second set of beams.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The invention claimed is:

1. A method, performed by a wireless device while in idle mode, for controlling discontinuous reception (DRX) during idle mode, the method comprising:
   selecting a default DRX cycle pattern for controlling operative instants during a DRX cycle,
   receiving, from an access node, a first set of beams in the operative instants of the default DRX cycle pattern;
   determining reception quality metrics for respective beams;
   based on the reception quality metrics, determining a customized DRX cycle pattern for controlling operative instants during a subsequent DRX cycle; and
   applying the customized DRX cycle pattern in the subsequent DRX cycle to receive a second set of beams.

2. The method of claim 1, wherein:
   the first and second set of beams are comprised in respective beam sweeps transmitted by an access node according to a DRX cycle periodicity; and
   each beam of the first set or the second set includes at least one OFDM symbol.

3. The method of claim 2, wherein:
   the default DRX cycle pattern is configured to accommodate reception of a plurality of beams comprised in a beam sweep; and
   the customized DRX cycle pattern is configured to accommodate reception of a subset of the beams comprised in the beam sweep.

4. The method of claim 2, wherein the operative instants are respective beam reception windows periodically recurring during a DRX cycle.

5. The method of claim 4, wherein selecting a default DRX cycle pattern for controlling operative instants during a DRX cycle comprises:
   determining a default timing for receiving beams comprised in a beam sweep during the DRX cycle; and
   for each beam reception window of the default DRX cycle pattern, assigning a start time and a duration or an end time based on the determined default timing.

6. The method of claim 4, wherein the first set of beams is received over a plurality of DRX cycles during at least partially non-overlapping subsets of the operative instants.

7. The method of claim 6, wherein:
   determining the customized DRX cycle based on the reception quality metrics comprises selecting a subset of beam reception windows of the default DRX cycle pattern by a comparison of reception quality metrics determined for the respective beams; and
   each beam reception window is determined by a start time and one of a duration or an end time.

8. The method of claim 7, further comprising:
   receiving, from an access node, the second set of beams in the operative instants of the customized DRX cycle pattern;
   determining whether a repetition condition is fulfilled;
   when the repetition condition is determined as fulfilled, repeating the method from the step of determining reception quality metrics for respective beams; and
   when the repetition condition is determined as not fulfilled, repeating the method from the step of selecting a default DRX cycle pattern for controlling operative instants during a DRX cycle.

9. The method of claim 8, wherein:
   the repetition condition relates to mobility of the wireless device; and
   the repetition condition is fulfilled when the wireless device is stationary or in a low mobility state.

10. The method of claim 8, wherein:
    the repetition condition comprises a predetermined number of DRX cycles; and
    the repetition condition is fulfilled when the subsequent DRX cycle is one of the predetermined number of DRX cycles.

11. The method of claim 2, wherein determining the reception quality metrics for respective beams is based on at least two OFDM symbols received in respective beams, and comprises:
    determining a first decoding metric based on decoding a first set of resource elements in at least a first OFDM symbol;
    determining a second decoding metric based on decoding the first set of resource elements in at least a second OFDM symbol.

12. The method of claim 11, wherein the at least two OFDM symbols are received in an OFDM reception window associated with the default timing.

13. The method of claim 11, wherein each of the first and second decoding metrics is determined as a decoding error likelihood estimate of the set of resource elements.

14. The method of claim 11, wherein each of the first and second decoding metrics is determined based on a correlation matching performance for a correlation of the decoded resource elements with pilot symbols transmitted in the resource elements.

15. The method of claim 11, wherein determining (S33) the reception quality metrics comprises:
    receiving beams in the operative instants of the default DRX cycle pattern during a plurality of DRX cycles;
    determining quality metrics for respective beams in each of the plurality of DRX cycles; and
    determining the reception quality metrics by filtering the quality metrics from the plurality of DRX cycles.

16. The method of claim 11, wherein the second OFDM symbol is adjacent to the first OFDM symbol.

17. The method of claim 11, wherein the second OFDM symbol is non-adjacent to the first OFDM symbol.

18. The method of claim 11, wherein the determined customized DRX cycle pattern includes operative instants that accommodate beams having qualitatively similar reception quality metrics.

19. The method of claim 11, wherein the determined customized DRX cycle pattern includes operative instants that accommodate neighboring beams of the beams qualified to be accommodated through their determined reception quality metrics.

20. The method of claim 1, wherein each beam comprises one of the following: paging information, unsolicited system information, or broadcast information.

21. A non-transitory, computer readable storage medium having stored thereon a computer program that, when executed by processing circuitry of a wireless device, configures the wireless device to perform operations corresponding to the method of claim 1.

22. A wireless device configured for controlling discontinuous reception (DRX) during idle mode, the wireless device comprising:
  receiver circuitry configured for reception of radio signal beams in a beam sweep transmitted by an access node;
  processing circuitry operably coupled to the receiver circuitry, whereby the processing circuitry and the receiver circuitry are configured to cause the wireless device to perform operations corresponding to the method of claim 1.

* * * * *